US012606188B2

(12) United States Patent
Hecht et al.

(10) Patent No.: US 12,606,188 B2
(45) Date of Patent: Apr. 21, 2026

(54) VEHICLE PROACTIVE INTERACTION SYSTEM FOR OCCUPANT AWARENESS INCLUDING TIMING AND INTERACTION STYLE SELECTION

(71) Applicant: GM GLOBAL TECHNOLOGY OPERATIONS LLC, Detroit, MI (US)

(72) Inventors: Ron Hecht, Ra'anana (IL); Ohad Akiva, Hod Hasharon (IL); Omer Tsimhoni, Bloomfield Hills, MI (US); Ariel Telpaz, Givat Haim Meuhad (IL); Claudia Goldman-Shenhar, Mevasseret Zion (IL); Gershon Celniker, Netanya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 226 days.

(21) Appl. No.: 18/515,543

(22) Filed: Nov. 21, 2023

(65) Prior Publication Data

US 2025/0162602 A1     May 22, 2025

(51) Int. Cl.
| | |
|---|---|
| *B60W 50/10* | (2012.01) |
| *B60H 1/00* | (2006.01) |
| *B60W 10/30* | (2006.01) |
| *B60W 50/16* | (2020.01) |
| *B60W 60/00* | (2020.01) |

(52) U.S. Cl.
CPC ......... *B60W 50/10* (2013.01); *B60H 1/00735* (2013.01); *B60W 10/30* (2013.01); *B60W 50/16* (2013.01); *B60W 60/001* (2020.02); *B60W 2530/209* (2020.02); *B60W 2540/215* (2020.02); *B60W 2540/225* (2020.02); *B60W 2556/10* (2020.02)

(58) Field of Classification Search
None
See application file for complete search history.

(56) References Cited

U.S. PATENT DOCUMENTS

| | | | | |
|---|---|---|---|---|
| 9,798,799 B2 * | 10/2017 | Wolverton | .............. | G10L 15/22 |
| 9,809,169 B1 * | 11/2017 | Naboulsi | ................. | B60R 1/025 |
| 10,633,006 B2 * | 4/2020 | Van Hoecke | ........... | H04W 4/40 |
| 10,717,444 B1 * | 7/2020 | Chan | ..................... | B60W 50/14 |
| 11,003,248 B2 * | 5/2021 | Woo | ........................ | G06F 3/015 |
| 11,315,544 B2 * | 4/2022 | Bender | ................. | G10L 13/047 |
| 11,428,540 B1 * | 8/2022 | Gray | ................. | G01C 21/3492 |

(Continued)

*Primary Examiner* — Jonathan M Dager

(57) ABSTRACT

An assistance system includes: a perception module configured to collect sensor data including data tracking behavior of a vehicle occupant in a host vehicle, and to determine perception information describing a current situation warranting initiation of an interactive dialog with the vehicle occupant; an interactive goal module configured to determine an interactive goal based on the determined perception information; an interaction timing module configured to determine timing for initiating the interactive dialog based on the interactive goal; a dialog module configured to, based on the perception information and the timing, initiate the interactive dialog to provide at least one of a suggestion and an offer to the vehicle occupant; and a vehicle control module configured to control operation of at least one of a device and a system of the host vehicle in response to the vehicle occupant accepting the at least one of the suggestion and the offer.

18 Claims, 9 Drawing Sheets

(56)         References Cited

U.S. PATENT DOCUMENTS

| | | | | |
|---|---|---|---|---|
| 11,926,259 | B1 * | 3/2024 | Joo | G08G 1/0967 |
| 11,938,958 | B2 * | 3/2024 | Teraguchi | B60W 50/14 |
| 2006/0232444 | A1 * | 10/2006 | Lee | G08G 1/096716 |
| | | | | 340/995.19 |
| 2008/0269958 | A1 * | 10/2008 | Filev | G06N 3/006 |
| | | | | 701/1 |
| 2011/0193726 | A1 * | 8/2011 | Szwabowski | B60R 16/0373 |
| | | | | 340/425.5 |
| 2012/0323453 | A1 * | 12/2012 | Havimaki | A01G 23/00 |
| | | | | 701/50 |
| 2014/0310610 | A1 * | 10/2014 | Ricci | G06Q 30/0645 |
| | | | | 715/744 |
| 2015/0175168 | A1 * | 6/2015 | Hoye | B60W 40/09 |
| | | | | 434/64 |
| 2018/0031405 | A1 * | 2/2018 | Berentsen | G01C 21/3469 |
| 2018/0047201 | A1 * | 2/2018 | Filev | G06T 13/205 |
| 2018/0118219 | A1 * | 5/2018 | Hiei | B60W 50/14 |
| 2018/0319402 | A1 * | 11/2018 | Mills | B60W 10/04 |
| 2019/0029002 | A1 * | 1/2019 | Kotzer | H04L 67/12 |
| 2022/0121865 | A1 * | 4/2022 | Austin | G06V 40/193 |
| 2022/0161805 | A1 * | 5/2022 | Lee | B60W 30/0953 |
| 2022/0176968 | A1 * | 6/2022 | Brooks | G06F 18/2193 |
| 2022/0321694 | A1 * | 10/2022 | Singh | H04M 1/72463 |
| 2023/0382329 | A1 * | 11/2023 | Roberts | B60W 60/0016 |
| 2024/0115176 | A1 * | 4/2024 | Molinska | G16H 50/30 |
| 2024/0157863 | A1 * | 5/2024 | Muthyala | B60N 2/0244 |
| 2024/0328801 | A1 * | 10/2024 | Lota | G01C 21/3484 |
| 2025/0006194 | A1 * | 1/2025 | Natarajan | G10L 15/22 |
| 2025/0029488 | A1 * | 1/2025 | Zahid | H04W 64/003 |
| 2025/0065890 | A1 * | 2/2025 | Theisinger | B60W 50/0098 |

* cited by examiner

VEHICLE PROACTIVE INTERACTION SYSTEM FOR OCCUPANT AWARENESS INCLUDING TIMING AND INTERACTION STYLE SELECTION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle occupant interactive systems.

A host vehicle can include various systems for assisting a driver, for performing autonomous operations, and/or for indicating to a vehicle occupant information regarding an environment of the host vehicle. For example, a host system may include a navigation system that provides map information indicating lane boundaries, street locations, speed limits, geographical locations of selected destinations, etc. The host system may provide the driver with instructions for driving to a selected destination and/or may perform autonomous operations such as braking, steering and accelerating operations to drive the vehicle to the destination based on the map information.

As another example, a host vehicle can include object detection and collision warning systems for detecting impending objects and performing countermeasures and/or taking evasive action to prevent a collision. The vehicle can include various sensors for detecting objects, such as other vehicles, pedestrians, cyclists, etc. A controller determines locations of the objects relative to the host vehicle and trajectories of the objects and the host vehicle. If it is determined that the host vehicle is likely to collide with one of the objects, one or more warning signals may be generated to indicate to the driver and/or the object of concern of the potential collision. The controller may also or alternatively perform one or more other countermeasures (e.g., apply brakes to decelerate the host vehicle, change a steering angle of the host vehicle, etc.) to prevent a collision.

SUMMARY

An assistance system is disclosed and includes: a perception module configured to collect sensor data including data tracking behavior of a vehicle occupant in a host vehicle, and to determine perception information describing a current situation warranting initiation of an interactive dialog with the vehicle occupant; an interactive goal module configured to determine an interactive goal based on the determined perception information; an interaction timing module configured to determine timing for initiating the interactive dialog based on the interactive goal; a dialog module configured to, based on the perception information and the timing, initiate the interactive dialog to provide at least one of a suggestion and an offer to the vehicle occupant; and a vehicle control module configured to control operation of at least one of a device and a system of the host vehicle in response to the vehicle occupant accepting the at least one of the suggestion and the offer.

In other features, the assistance system further includes: an outward analysis module configured to collect data from exterior sensors; an occupant module configured to collect data from interior sensors; and a vehicle status module configured to collect data from vehicle status sensors. The perception module is configured to determine the perception information based on the data collected from the exterior sensors, the data collected from the interior sensors, and the data collected from the vehicle status sensors.

In other features, the perception module determines the perception information based on navigation information received from a navigation module.

In other features, the assistance system further includes an interaction style module configured to select an interaction style from a group including speech, text, and haptic vibrations to communicate with the vehicle occupant during the interactive dialog. The dialog module is configured to, during the interactive dialog, communicate with the vehicle occupant using the interaction style.

In other features, the interaction style module is configured to select the interactive style based on historical data indicative of which interaction style is likely to be accepted by the vehicle occupant.

In other features, the interaction timing module is configured to determine at least one event trigger and gap pair based on which to initiate the interactive dialog, the at least one event trigger and gap pair being determined based on the interactive goal.

In other features, the interaction timing module is configured to determine event trigger and gap pairs based on which to initiate the interactive dialog, the event trigger and gap pairs being determined based on the interactive goal.

In other features, the perception module is configured to determine a situation category and a corresponding confidence level. The interaction timing module is configured to determine the timing to initiate the interactive dialog based on the situation category and the confidence level.

In other features, the interaction timing module is configured to i) determine a selection criterion based on which to select at least one event trigger and gap pair, and ii) select the at least one event trigger and gap from a group of event trigger and gap pairs, where the selection criterion includes determining at least one of i) whether a percentage of at least one of acceptance and interactive dialog completion for the selected at least one event trigger and gap pair is greater than a threshold, and ii) whether the percentage of at least one of acceptance and interactive dialog completion for the selected at least one event trigger and gap pair is greater than a percentage of acceptance and interactive completion for other ones of the group of event trigger and gap pairs. At least one of the interaction timing module and the dialog module initiates the interactive dialog based on the selected at least one event trigger and gap pair.

In other features, the timing interaction module is configured to generate a histogram based on historical data including gaps for at least one event trigger, and select at least one of the gaps based on the histogram. At least one of the timing module and the dialog module initiates the interactive dialog based on the selected at least one of the gaps.

In other features, the perception module is configured to track gaze and head patterns of the vehicle occupant to determine the perception information based on the gaze and head patterns.

In other features, the perception module is configured to determine whether the gaze and head patterns are indicative of whether the vehicle occupant is looking for a refueling station or a recharging station. The interactive goal module is configured to generate the interactive goal to refuel the host vehicle or recharge a battery or a battery pack of the host vehicle.

In other features, the vehicle control module is configured to perform autonomous driving operations in response to the vehicle occupant accepting the at least one of the suggestion and the offer.

In other features, the vehicle control module is configured to activate at least one of a defogging system and an air recirculation feature of a heating, ventilation, and air-conditioning system in response to the vehicle occupant accepts the at least one of the suggestion and the offer.

In other features, an assistance method is provided and includes: collecting sensor data including data tracking behavior of a vehicle occupant in a host vehicle; determining perception information describing a current situation warranting initiation of an interactive dialog with the vehicle occupant; determining an interactive goal based on the determined perception information; determining timing for initiating the interactive dialog based on the interactive goal; based on the perception information and the timing, initiating the interactive dialog to provide at least one of a suggestion and an offer to the vehicle occupant; and controlling operation of at least one of a device and a system of the host vehicle in response to the vehicle occupant accepting the at least one of the suggestion and the offer.

In other features, the assistance method further includes: collecting navigation information; collecting data from exterior sensors; collect data from interior sensors; collecting data from vehicle status sensors; and determining the perception information based on the navigation information, the data collected from the exterior sensors, the data collected from the interior sensors, and the data collected from the vehicle status sensors.

In other features, the assistance method further includes: selecting an interaction style from a group including speech, text, and haptic vibrations to communicate with the vehicle occupant during the interactive dialog, and based on historical data indicative of which interaction style is likely to be accepted by the vehicle occupant; and during the interactive dialog, communicating with the vehicle occupant using the selected interaction style.

In other features, the assistance method further includes determining at least one event trigger and gap pair based on which to initiate the interactive dialog, the at least one event trigger and gap pair being determined based on the interactive goal.

In other features, the assistance method further includes: determining a situation category and a corresponding confidence level; and determining the timing to initiate the interactive dialog based on the situation category and the confidence level.

In other features, the assistance method further includes: generating a histogram based on historical data including gaps for at least one event trigger, and select at least one of the gaps based on the histogram; and initiating the interactive dialog based on the selected at least one of the gaps.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
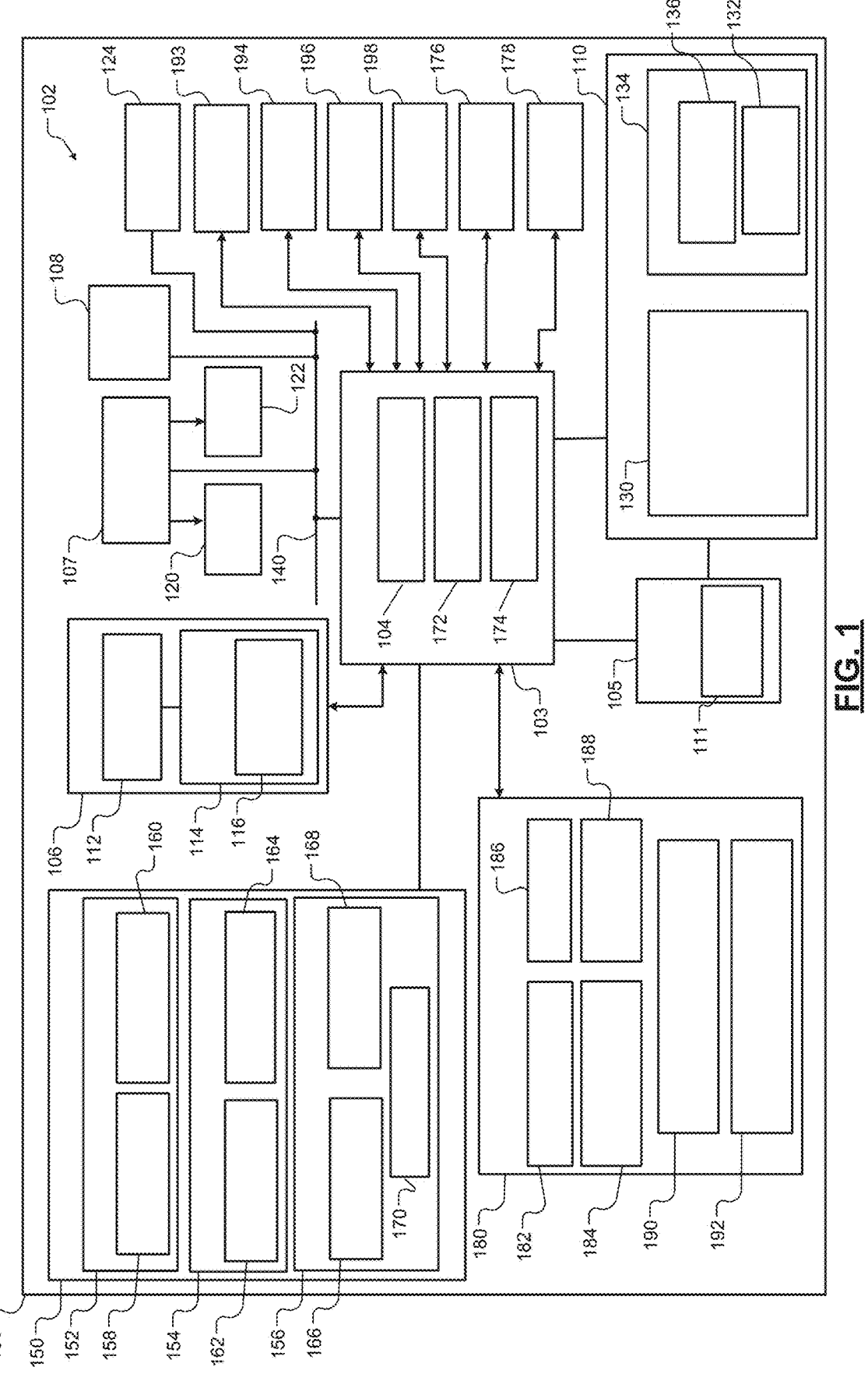
FIG. 1 is a functional block diagram of a host vehicle including an example vehicle control module implementing a proactive module in accordance with the present disclosure.

A virtual assistant of a host vehicle can provide a vehicle occupant, such as a driver and/or a passenger, suggestions and/or offers for certain services and/or to perform certain tasks. For example, a virtual assistant may suggest when to get gas and where a gas station is located relative to the host vehicle. As another example, a virtual assistant may indicate when certain music services are available or when the host vehicle is approaching a restaurant or a shop of interest to the vehicle occupant. Virtual assistants have the potential to be proactive but in order to be user friendly, virtual assistants ought to minimize interruptions and provide interruptions that are likely to be acceptable to vehicle occupants. If interruptions are provided too often and/or provided at inappropriate times, the interruptions can be perceived by the vehicle occupants as an annoyance.

The examples set forth herein include a virtual assistance system and methods for proactive interaction between the virtual assistant system and vehicle occupants. The proactive interaction is timely initiated based on information from multiple sources. The information is combined and used to minimize interruptions and to provide interruptions when a situation calls for such an interruption that has a high probability of being deemed appropriate by a vehicle occupant. The virtual assistance system determines when and what type of interruptions to make such that the interruptions are considered timely and acceptable by the vehicle occupant.

The virtual assistance system monitors real-time behavior of vehicle occupants including speech, gaze patterns, head positions, gestures (e.g., hand gestures, finger gestures, facial gestures, etc.). Gaze patterns include directions of an occupant's head and eyes. Determining a gaze pattern includes determining what the occupant is looking at, how long the occupant is looking in a certain direction, how often the occupant is changing what the occupant is looking at, etc. For example, and during a certain period of time, a vehicle occupant may look straight ahead through the windshield 60% of the time, an instrument cluster 20% of the time and a center stack 20% of the time. Similarly, a vehicle occupant may look at the fuel gauge in the instrument cluster, then at a gas station sign, and then at the navigation map. This may indicate that the occupant is looking for a gas station or other business. Based on this information, an interactive dialog with the vehicle occupant may be initiated. As another example, a user may exhibit a sequence of glances and/or a sequence of user actions when looking for something (e.g., a particular and/or type of business) based on which an interactive dialog with the vehicle occupant may be initiated.

The virtual assistance system gathers vehicle contextual data such as vehicle network data from a vehicle bus or interface such as from a controller area network (CAN) bus including vehicle active features. The virtual assistance system also gathers data from various sensors and a navigation system. The sensors include exterior monitoring sensors, interior monitoring sensors, and other sensors such as vehicle state sensors. The virtual assistance system may monitor an environment of the vehicle including performing external scene analysis and monitoring traffic, road, and weather information. The virtual assistance system further collects historical data including occupant historical behavior data (e.g., driving patterns, stopping patterns, dropping off patterns, refueling patterns, shopping preferences, usage of infotainment by occupant including usage of specific applications, times of use of the applications, and actions performed in the applications, etc.) and other historical data including dialog interaction history. Interaction history includes previous interaction dialogs between the virtual assistance system and vehicle occupant. The interaction history includes i) probabilities of prompt acceptance of provided suggestions and offers by vehicle occupants, and ii) interaction durations between the virtual assistance system and the vehicle occupants. The interaction history may be occupant specific, vehicle specific, geographical location specific, associated with multiple and/or a group of vehicle occupants, associated with multiple and/or a group of vehicles, etc.

The virtual assistance system, based on the above information and other information referred to herein, determines when to initiate interruptions and interactions. The information may be stored, generated, collected, compared, and/or analyzed, as further described below. The virtual assistance system also selects the style and modality of interaction, such as audio (or speech), displayed text, haptic vibrations, displayed objects, etc.

The virtual assistance system implements algorithms to determine the timing to initiate interactive proactive dialogs with vehicle occupants. The timing is selected to minimize a false alarm rate, such that the number of rejected suggestions and/or offers is minimized and/or zero. Sensor data including vehicle occupant gaze patterns are used as inputs to the algorithms. Interaction style is selected and/or altered to maximize success rate (i.e., percentage of suggestions and/or offers accepted by vehicle occupants and corresponding interactive dialogs completed by the vehicle occupants).

As an example, the virtual assistance system may determine that a fuel level indicated by a fuel gauge of a host vehicle is low and/or within a range when a driver typically refuels. The fuel level may not be low enough to illuminate a low fuel light and/or to indicate to the driver that refueling is needed. The driver may be looking along the side of the road for fuel station signs and/or fuel stations. This may be detected based on data from one or more interior cameras, one or more exterior cameras, and a navigation system. The virtual assistance system may determine that it is an appropriate time to initiate a dialog suggesting a suitable fuel station to the driver. The interaction dialog is initiated at an optimal distance (e.g., an amount of time to initiate an interaction dialog or an amount of time to get to the fuel station) with the highest likelihood of the driver accepting a suggestion to refuel and continue the interaction dialog. In an embodiment, the interaction dialog is initiated when the likelihood of the driver accepting a suggestion and continue the interaction dialog is above a set threshold. An interaction style is selected to maximize the success rate. As an example, the virtual assistance system may display a text and/or audibly playout a message such as "Would you like me to find you a suitable fuel station along your route?".

FIG. 1 shows a vehicle 100 including a proactive virtual assistance system 102 having a vehicle control module 103, which as shown includes a proactive module 104. The proactive module 104 as described further below performs perception (or situation) determining operations, historical data look-up and data gathering operations, interaction timing operations, interaction style operations, and dialog operations including providing speech, text, and/or haptic messages. The vehicle control module 103 may perform various operations based on the interaction with the user and the messages, generated as further described below. The vehicle control module 103 may perform autonomous operations based on the interaction including responses received from the user.

The vehicle 100 and the proactive virtual assistance system 102 further includes one or more power sources 105, a telematics module 106, an infotainment module 107, other control modules 108 and a propulsion system 110. The vehicle control module 103 may control operation of the vehicle 100 and the modules 104, 106, 107, 108 and the propulsion system 110. The power sources 105 may include one or more battery packs, a generator, a converter, a control circuit, terminals for high and low voltage loads, etc., as well as one or more battery sensors 111 for detecting states of the power sources 105 including voltages, current levels, states of charge, etc.

The telematics module 106 provides wireless communication services within the vehicle 100 and wirelessly communicates with service providers and devices external to the vehicle 100. The telematics module 106 may support Wi-Fi®, Bluetooth®, Bluetooth Low Energy (BLE), near-field communication (NFC), cellular, legacy (LG) transmission control protocol (TCP), long-term evolution (LTE), and/or other wireless communication and/or operate according to Wi-Fi®, Bluetooth®, BLE, NFC, cellular, and/or other wireless communication protocols. The telematics module 106 may include one or more transceivers 112 and a navigation module 114 with a global positioning system (GPS) and GNSS (or Global Navigation Satellite System) receiver 116. The transceivers 112 wirelessly communicate with network devices internal and external to the vehicle 100 including cloud-based network devices, central stations, back offices, and portable network devices. The transceivers 112 may perform pattern recognition, channel addressing, channel access control, and filtering operations.

The navigation module 114 executes a navigation application to provide navigation services. The navigation services may include location identification services to identify where the vehicle 100 is located. The navigation services may also include guiding a driver and/or directing the vehicle 100 to a selected location. The navigation module 114 may communicate with a central station to collect map information indicating levels of traffic, transportation object identification and locations (e.g., locations and types of signs), path information, where rest areas are located, where gas stations are located, where restaurants are located, etc. As an example, if the vehicle 100 is an autonomous vehicle, the navigation module 114 may direct the vehicle control module 103 along a selected route to a selected destination. The GPS and GNSS receiver 116 may provide vehicle velocity and/or direction (or heading) of the vehicle 100 and other vehicles and objects (e.g., pedestrians and cyclists) and/or global clock timing information.

The infotainment module 107 may include and/or be connected to an audio system 122 and/or a video system including one or more displays (one display 120 is shown). The display 120 and audio system 122 may be part of a human machine interface. The displays may include cluster and/or center console displays, head-up displays, etc. Haptic devices 124 (e.g., steering wheel and/or seat vibration devices) may be used in addition to the displays and the audio system 122 to interact with a vehicle occupant such as a driver or passenger. This interaction is further described below. Messages may be displayed, audibly played out, and/or indicated via the display 120, the audio system 122, the haptic devices 124, and/or via one or more other output devices.

The infotainment module 107 may provide various proactive messages and information including information regarding upcoming and/or nearby gas stations, upcoming and/or nearby restaurants, music services, upcoming and/or nearby shops, vehicle status information, diagnostic information, prognostic information, entertainment features, etc. The infotainment module 107 may be used to guide a vehicle operator to a certain location, indicate trip estimations (e.g., distances to selected destinations), and other information.

The propulsion system 110 may include one or more torque sources, such as one or more motors and/or one or more engines (e.g., internal combustion engines). In the example shown in FIG. 1, the vehicle 100 includes an engine 130 and one or more motors 132. The torque sources are independently controlled. The propulsion system 110 includes a motor control system 134 that includes the one or more motors 132 and a motor control module 136 that may control operation of the one or more motors 132 based on signals from the vehicle control module 103.

The modules 103, 104, 107, 108 may communicate with each other via one or more buses 140, such as a controller area network (CAN) bus and/or other suitable interface. The vehicle control module 103 may control operation of vehicle modules, devices and systems based on feedback from sensors 150.

The sensors 150 may include exterior sensors 152, interior sensors 154, and other sensors 156. The exterior sensors 152 may include radar and/or lidar sensors 158 and imaging and audio devices (e.g., cameras and microphone or microphone array) 160. The exterior sensors 152 may be used to detect objects external to the vehicle 100 and/or in a path of the vehicle 100. The interior sensors 154 may include interior imaging sensors (e.g., cameras) 162 and a microphone or microphone array 164. The interior sensors 154 may be used to monitor a vehicle occupant. As an example, the interior sensors 154 may track eyes of a driver and eye gaze direction, detect gestures made by the driver, detect orientation of a body of the driver, detect speech of the driver, etc. This monitoring is useful in determining whether the driver is looking for a gas station, a restaurant, a rest area, or other shop and/or location. This monitoring may be used to determine whether the driver is looking at a particular sign or types of signs along a path of the vehicle 100. The interior sensors 154 may be used to detect, for example, when the driver is looking at signs indicating upcoming gas stations. This is indicative that the driver wants to stop to get gas. This type of monitoring is also applicable for other types of businesses, rest areas, and/or locations. The other sensors 156 may include a vehicle speed sensor 166, acceleration sensors (e.g., longitudinal and lateral acceleration sensors) 168, and a fuel level sensor 170, as shown, and other sensors such as an engine temperature sensor and an engine oil pressure sensor.

The vehicle control module 103 may also include a mode selection module 172 and a parameter adjustment module 174. The mode selection module 172 may select a vehicle operating mode. The parameter adjustment module 174 may be used to adjust parameters of the vehicle 100. As an example, the vehicle control module 103 may operate in a fully or partially autonomous mode and may control the propulsion system 110, a brake system 176, and a steering system 178. In an embodiment, the vehicle control module 103 controls operation of the systems 110, 176 and 178 based on interactions with a vehicle occupant via the proactive module 104. The vehicle control module 103 may i) perform autonomous operations such as steering, braking, accelerating, etc., and/or ii) display and/or audibly playout messages, perform haptic operations via haptic devices 124, and/or output messages and/or corresponding signals via other output devices.

The vehicle 100 may further include the memory 180. The memory 180 may store sensor data 182, parameters 184, applications 186, algorithms 188, historical data 190, and other data 192. The parameters may include sensor parameters such as vehicle speed, vehicle acceleration, battery state of charge, fuel level, etc. applications 186 (e.g., a trip energy estimation application). The applications 186 may include applications executed by the modules 103, 104, 107, 108.

Although the memory 180 and the vehicle control module 103 are shown as separate devices, the memory 180 and the vehicle control module 103 may be implemented as a single device. The memory 180 may also store historical data 190 and other data 192 such as driver driving patterns, driver fueling patterns, driver stopping patterns, driver pickup patterns, other driver patterns, data collected by and/or generated by the proactive module 104, traffic data, navigation data, map data, GPS data, path data, speed data, and acceleration data, etc.

The vehicle control module 103 may control operation of the propulsion system 110, the video system including the display 120, the audio system 122, the haptic devices 124, the brake system 176, the steering system 178, a heating ventilation and air-conditioning (HVAC) system 193, a lighting system 194, a seating system 196, a mirror system 198, and/or other devices and systems according to parameters set by the modules 103, 104, 107, 108. The HVAC system 193 may include a defogging system and/have an air recirculating feature. An additional defogging system may also be included. The vehicle control module 103 may set at least some of the parameters based on signals received from the sensors 150.

The vehicle control module 103 may receive power from the power sources 105, which may be provided to the propulsion system 110, the brake system 176, the steering system 178, a HVAC system 193, the lighting system 194, the seating system 196, the mirror system 198, etc. Power supplied to the motors 132, the brake system 176, the steering system 178, a HVAC system 193, the lighting system 194, the seating system 196, the mirror system 198, and/or actuators thereof may be controlled by the vehicle control module 103 to, for example, adjust: motor speed, torque, and/or acceleration; braking pressure; steering wheel angle; pedal position; state of haptic devices 124; etc. This control may be based on the outputs of the sensors 150, the navigation module 114, the GPS and GNSS receiver 116 and the data and information stored in the memory 180.

The vehicle control module 103 may determine various parameters including a vehicle speed, a motor speed, a gear state, an accelerator position, a brake pedal position, an amount of regenerative (charge) power, an amount of auto start/stop discharge power, and/or other information. The power sources 105 and/or a control circuit thereof may determine other parameters, such as: an amount of charge power at each source terminal; an amount of discharge power at each source terminal; maximum and minimum voltages at source terminals; maximum and minimum voltages at power rails, cells, blocks, packs, and/or groups; SOX values of cells, blocks, packs, and/or groups; temperatures of cells, blocks, packs, and/or groups; current values of cells, blocks, packs, and/or groups; power values cells, blocks, packs, and/or groups; etc. The acronym "SOX" refers to a state of charge (SOC), a state of health (SOH), state of power (SOP), and/or a state of function (SOF). Power, voltage and/or current sensors may be included separate from and/or in the power sources 105 for SOX determinations. The SOC of a cell, pack and/or group may refer to the voltage, current and/or amount of available power stored in the cell, pack and/or group. The SOH of a cell, pack and/or group may refer to: the age (or operating hours); whether there is a short circuit; whether there is a loose wire or bad connection; temperatures, voltages, power levels, and/or current levels supplied to or sourced from the cell, pack and/or group during certain operating conditions; and/or other parameters describing the health of the cell, pack and/or group. The SOF of a cell, pack and/or group may refer to a current temperature, voltage, and/or current level supplied to or sourced from the cell, pack and/or group, and/or other parameters describing a current functional state of the cell, pack and/or group. The power sources 105 may determine connected configurations of the cells and corresponding switch states as described herein based on the parameters determined by the vehicle control module 103 and/or the control circuit (or module) of the power sources 105.

Figure 2:
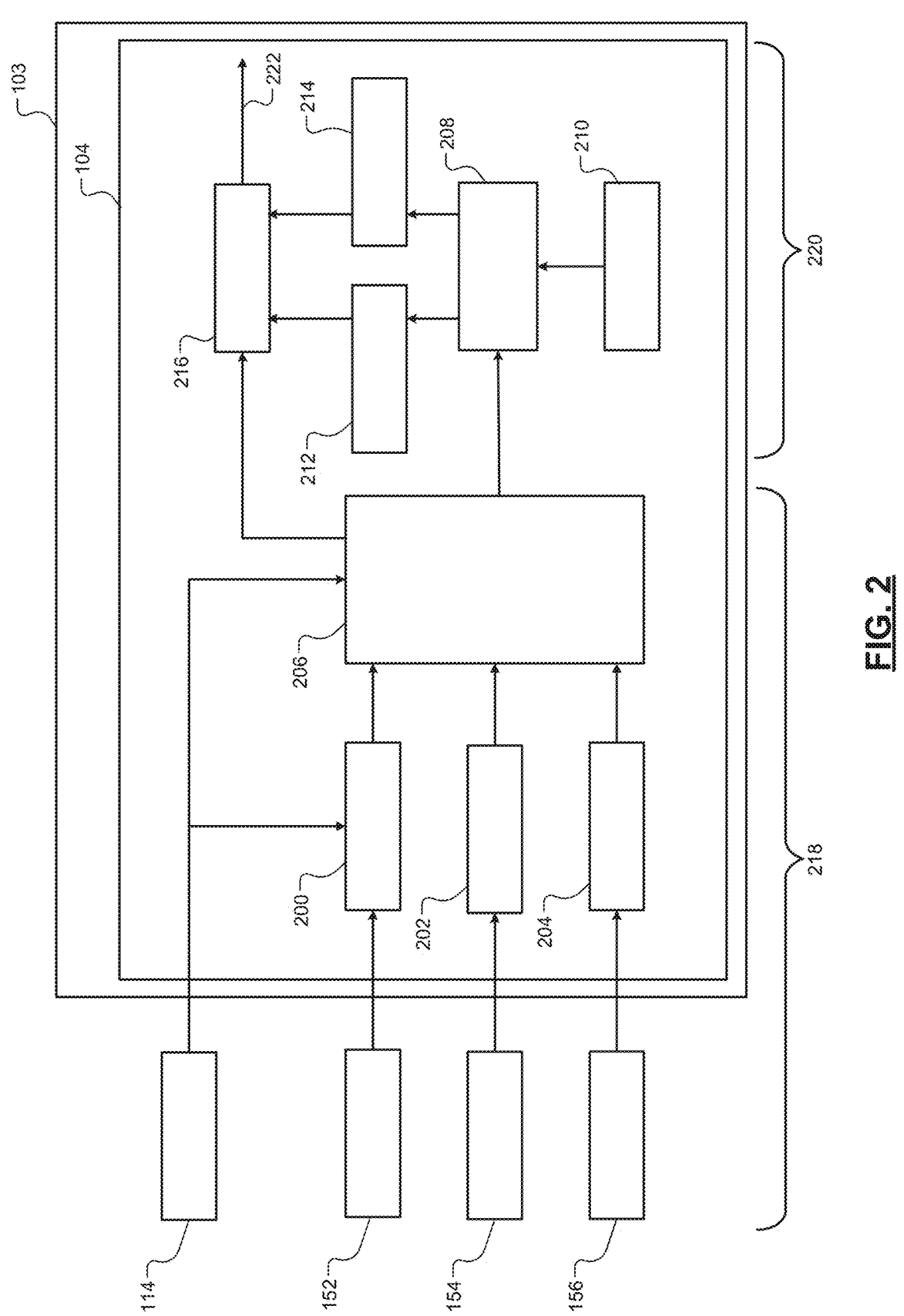
FIG. 2 is a functional block diagram of the vehicle control module and proactive module of FIG. 1 including an interaction timing module in accordance with an embodiment of the present disclosure.

FIG. 2 shows the vehicle control module 103 and proactive module 104 of FIG. 1. The proactive module 104 may receive data and information from the navigation module 114, the sensors 152, 154, 156, and/or other devices and sensors, such as information from a wireless network, information from nearby vehicles, information from a back office, etc. The proactive module 104 may include an outward analysis module 200, an occupant module 202, a vehicle status module 204, a perception module 206, a data gathering and interactive goal module 208, a history module 210, an interaction style module 212, an interaction timing module 214, and a dialog module 216. In one embodiment, the modules 208 and 216 are integrated to form a single module.

The proactive virtual assistance system 102 of FIG. 1 implements a proactive stage 218 and an action stage 220, shown in FIG. 2. The proactive stage 218 includes the navigation module 114, sensors 152, 154, 156, and modules 200, 202, 204, and 206. The action stage 220 includes the modules 208, 210, 212, 214, and 216. The proactive stage or portions thereof may collect data and/or information from other systems. For example, the outward analysis module 200 may collect data and information regarding traffic objects from an autonomous or semi-autonomous drive module or system, as opposed to directly from the exterior sensors 152.

The outward analysis module 200 is configured to collect data from the navigation module 114 and the exterior sensors 152 to detect an exterior environment of the host vehicle and presence and locations of nearby businesses. The outward analysis module 200 detects traffic objects such as: vehicles; pedestrians; cyclists; road signs; traffic lights; signs indicating upcoming businesses such as gas stations, restaurants, shops, etc.; and other objects. The outward analysis module 200 detects lanes, roads, road curvatures, etc. The outward analysis module 200 provides the detected and determined information to the perception module 206. In an embodiment, the outward analysis module 200 receives raw data streams from the exterior sensors 152. Based on the raw data streams, the outward analysis module 200 creates a list of objects around the host vehicle, location type, road curvature and type, etc. The raw data can originate from other devices and/or systems then from the exterior sensors 152. The outward analysis module 200 sends the list of objects to the perception module 206.

The occupant module 202 collects data from the interior sensors 154. The occupant module 202 tracks, monitors and/or detects occupant head positions, eye movements, directions, and positions, gestures, body positioning, occupant speech, etc. and provides this information to the perception module 206. Gestures may include hand waves, finger swipes, finger taps, finger pointing, head nodding, arm movement, etc. Gestures may be provided on a display, on a steering wheel, on a center counsel, on an armrest, on another vehicle component, on a gear (or transmission) shifter, and/or without touching a vehicle component. The occupant module 202 may receive raw data streams the interior sensors 154, which are in the internal cabin of the host vehicle. This information is provided to the perception module 206 for extraction of passengers and driver related information. The extracted information includes gaze patterns and gaze directions determined based on the raw data streams from the interior sensors 154.

The vehicle status module 204 collects data from vehicle status sensors, such as vehicle speed, vehicle longitudinal and lateral accelerations, fuel level, battery state of charge, etc. The vehicle status module 204 determines vehicle states and provides this information to the perception module 206. The vehicle status module 204 may receive raw data from the sensors 156. The vehicle status module 204 may send the raw data and/or information determined based on the raw data to the perception module 206.

The perception module 206, based on the collected information from the modules 200, 202, 204 and optionally information from the navigation module 114, determines a current situation. The perception module 206 processes and analyzes the collected information to determine the current situation. The navigation module 114, in addition to the above-stated information provided by the navigation module 114, may also provide information such as where the host vehicle is heading, a likely path of the host vehicle, an indication of where the host vehicle is supposed to be, and driver history. The driver history may include, for example, indications of typical destinations of the driver, typical stops of the driver, typical likes and dislikes of the driver, etc. The perception module 206 determines the situation and indicates the situation to the data gathering and interactive goal module 208. As an example, the situation may include indications of whether the fuel level is appropriate to suggest getting fuel, whether the vehicle is within an appropriate range of a fuel station to suggest getting fuel at that gas station, and whether the driver behavior is appropriate to suggest getting fuel. Information for various different situations may be provided.

In an embodiment, the perception module 206 predicts a driver's needs and sends a message to the data gathering and interactive goal module 208 and/or the dialog module 216 to initiate a relevant dialog. For example, if the host vehicle has a low fuel level and the driver keeps looking at fuel station signs, locations, and/or prices, the perception module 206 sends a message to initiate a dialog about finding and traveling to a relevant fuel station.

The data gathering and interactive goal module 208 collects the information from the modules 206 and 210 and provides that information to the modules 212, 214. The data gathering and interactive goal module 208 receives past interaction data from the history module 210 and augments this information with other gathered information, which is then provided to the modules 212, 214. The data gathering and interactive goal module 208 may determine an interactive goal based on the data collected. The interactive goal may be, for example, to gain approval: to proceed to a refueling station to refuel the host vehicle; to stop at a restaurant; to proceed to a recharging station to recharge one or more batteries and/or battery packs of the host vehicle, to pick up a passenger; or to perform another task. The interactive goal may be indicated to the modules 212, 214.

The history module 210 may collect prior proactive interaction data to determine when a vehicle occupant has typically accepted a particular suggestion and/or offer. The history module 210 may provide probabilities associated with acceptance of suggestions and offers. The probabilities may be associated with different interaction styles, be specific to geographical locations, be associated with timing of suggestions and offers, etc. Timing refers to i) the amount of time until a suggestion and/or offer is presented to a user, and/or ii) an amount of time until the host vehicle arrives at a corresponding destination (e.g., a fuel station or restaurant) of the suggestion and/or offer. Timing may refer to distances between a current host vehicle location and i) a location when the suggestion and/or offer is to be provided, or ii) a location when the host vehicle arrives at the corresponding destination of the suggestion and/or offer.

The interaction style module 212 determines an interaction style based on the information provided by the data gathering and interactive goal module 208. The interaction styles may include speech played out via an audio system, text displayed on a display, haptic vibrations, an icon (or button) displayed on a display, etc.

The interaction timing module 214 determines when it is appropriate to initiate an interactive dialog with a vehicle occupant based on the information provided by the data gathering and interactive goal module 208. The interaction timing module 214 may implement one or more methods to determine the appropriate timing. Some example methods are described with respect to FIGS. 3-7.

The interaction timing module 214 may determine the appropriate timing based on trigger events. As an example, the timing may be based on a state of charge of one or more batteries (or one or more battery packs). If a battery state of charge level is low, and a driver is looking for a charging station and/or is looking at charging stations, and the current driver destination is out of range of the host vehicle for the current state of charge, then a dialog may be initiated. In this situation, the interaction timing module 214 initiates a dialog at an appropriate time and suggests a charging station to stop at. The dialog is initiated at an optimal distance from and/or an optimal amount of time ahead of the charging station. This timing (distance and amount of time) has a corresponding highest likelihood for the driver to accept and continue with the corresponding interactive dialog. The style (or optimal style) of the interaction is selected by the interaction style module 212 in order to maximize success (i.e., driver accepts and continues interacting until arriving at station). Other example trigger events are described below.

The dialog module 216 may be referred to as a "virtual assistant" and proactively initiates a dialog with vehicle occupants at appropriate times. A dialog begins with the dialog module 216 providing a suggestion and/or offer to a vehicle occupant. The suggestion and/or offer may be presented in the form of a question, a statement, an icon (or button) to tap, or in some other manner that would not be perceived as annoying to the vehicle occupant. The dialog module 216 may send signals 222 to and from, for example, displays, an audio system, and haptic devices, such as the display 120, the audio system 122, the haptic devices 124.

As another trigger event example, when the fuel gauge of the host vehicle indicates that fuel is low, but not low enough for the low-fuel light to turn on, and i) the driver is looking repeatedly at fuel station signs, and/or ii) at fuel stations or the driver is distracted, an interactive dialog is initiated. The dialog module 216 initiates the dialog suggesting a suitable fuel station to the driver. The dialog is initiated at an optimal distance and/or amount of time to the fuel station with the highest likelihood for the driver to continue the interactive dialog. The timing may be determined and set by the interaction timing module 214. The style of the interaction is selected by the interaction style module 212.

As another trigger event example, the dialog module 216 may initiate a dialog to perform partial or full autonomous driving (e.g., level 2 driving). This may occur when certain conditions exist, such as: an open road ahead (i.e., few to no other vehicles ahead); the weather is good; and no premature disengagements (e.g., driver takes control of driving) have been detected. The interaction timing module 214 determines a best time to start the interactive dialog for engaging autonomous driving.

An interactive dialog may be initiated: to look for a fuel station while a phone conversation is being conducted by the driver of the host vehicle; to activate a defogging system; to activate an air recirculation feature of a HVAC system of the host vehicle; to make regular calls; to play occupant favorite music or podcasts; and to pick up a passenger along a route. The interaction timing module 214 may determine a best time to remind a driver about picking up a passenger. This may be determined based on historical data such as past driver habits and/or passenger pickup times, and/or may be based on a stored passenger pickup schedule. As an example, an interactive dialog may be initiated to turn on the air recirculation feature when the host vehicle is driving in an area that is known to be typically "smelly". For example, when driving past a garbage dump. Further, the interactive dialog may result in setting changes that determine the level of automation for future situations such that in future cases recirculation will always be activated automatically.

In an embodiment, the perception module 206 determines a situation category for a certain detected situation. This information may be used by the interaction timing module 214 to determine timing of an interactive dialog. A method for categorizing a situation is carried out by the perception module 206. The categorization may be based on data from the sensors 152, 154, and 156 including data indicating an environment, behavior of a driver (or vehicle occupant), and states of components and systems of the host vehicle. The perception module 206 formalizes a situation given the inputs and outputs a categorization along with a confidence level in that categorization. The confidence level may be a number between 0 and 1. A low confidence level indicates that the categorization has a low probability of being accurate. A high confidence level indicates that the categorization has a high probability of being accurate.

The confidence level refers to a confidence of the perception module 206 in it's own predictions including, for example, how accurate is the categorization of the situation. The likelihood of a user accepting an offer may be based on a model learned about the user. In one embodiment, when the confidence level is high and when the situation categorization refers to the user potential for accepting the offer, there is a high likelihood that the user will accept the suggestion and/or offer. In another embodiment, the confidence level is based on the timing of an intervention but not the content of that intervention.

The situation categories may include: an immediate-communication category, which requires immediate interaction with user (e.g., immediate speech interaction with the user); a timed-communication category, which requires interaction with user in X seconds, where X is a positive real number; an ask category, which requires clarification from the user; and an explain category, where a user needs an explanation. In an embodiment, the situation category is determined based on a set of rules and/or based on a machine learning classifier. A machine learning classifier can learn from expert annotated data, or from studies revealing what users prefer to get in certain driving contexts.

As an example, if the user is looking at the fuel gauge and around a highway with some frequency, then the dialog module 216 may initiate a dialog with the user to clarify whether the user is looking for a gas station. As another example, if the user is looking at a display of a navigation system and at signs along a road, then the dialog module 216 may provide information for a next turn or exit ramp. As yet another example, if the user keeps engaging and disengaging from level 2 autonomous driving, the dialog module 216 may provide an explanation about the driving behavior of the host vehicle.

The interaction timing module 214, when implementing a rule-based approach, may initiate an interaction dialog when a predetermined set of rules are satisfied and/or a predetermined pattern of conditions are detected. The rules may include logical terms such as AND, OR and NOT that relate conditions to a certain event. As an example, a certain event may exist when the fuel level is low AND the driver is looking at fuel station signs and/or fuel stations. As another example, a certain event may exist when a distance (e.g., from a current location or a navigation distance) is less than a threshold (e.g., 4 kilometers) AND the driver is looking for parking. As another example, a certain event may exist when a workload based on a gaze pattern of a driver is low AND this occurred a predetermined period (e.g., 5 seconds) after the driver looked at the rearview mirror of the host vehicle.

A gaze pattern of the driver may be detected and when the gaze pattern matches a predetermined pattern and/or satisfies a predetermined criterion, an interaction dialog is initiated.

In an embodiment, the interaction timing module 214 determines timing to initiate an interactive dialog based on the situation category and corresponding confidence level. The timing, for example, i) may occur now, ii) may occur in x seconds, where x is a positive real number, or iii) may not occur. The dialog module 216 may playout or display a message now, in x seconds, or not at all even though the situation may be appropriate for making a suggestion and/or offer. This timing may be rule based and/or based on output of the machine learning classifier.

In another embodiment, the timing is based on an event trigger and a gap. An event trigger refers to one or more conditions that exist to warrant an interactive dialog. A gap refers to a distance between a current location of the host vehicle and i) a location when the interaction dialog is initiated, or ii) a proposed destination associated with a suggestion and/or an offer. The gap may be defined in terms of an amount of time such as i) an amount of time until the interactive dialog is initiated, or ii) an amount of time until the host vehicle arrives at the proposed destination.

One or more event trigger and gap pairs may be selected and used as the criterion based on which to initiate an interaction dialog. The selection of a single event trigger and gap pair may be referred to as a hard selection. The selection of multiple event trigger and gap pairs may be referred to as a soft selection. Each event trigger and gap pair defines a point in time in which the interaction starts. Optimal timing is learned by an iterative learning process, which maximizes an optimality criterion. The optimality criterion refers to the one or more event trigger and gap pairs that when used to initiate a dialog result in the highest probability of the corresponding suggestion and/or offer being accepted by the user and/or a highest probability of the interaction dialog being completed (i.e., the user accepting and following through with the suggest and/or offer). An example of timing includes an interaction dialog beginning X meters before a host vehicle exits a highway to go to a fuel station. As another example, timing may include an interaction dialog beginning T seconds before the host vehicle could arrive at a particular restaurant. As another example, timing may include an interaction dialog beginning K kilowatt-hours (kWh) before a host vehicle could arrive at a charging station, where X, T, and K are positive real numbers. This is an example of when timing or more specifically the gap is defined in kilowatt-hours (or battery state of charge), instead of time or distance. A gap may also be defined in terms of a fuel level (i.e., amount of fuel in a fuel tank) of the host vehicle.

Figure 3:
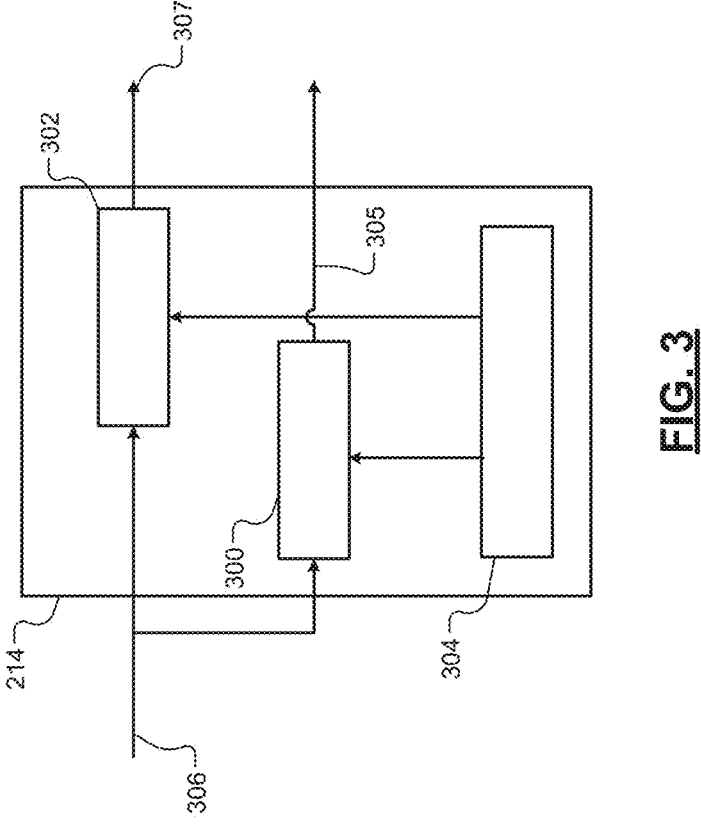
FIG. 3 is a functional block diagram of the interaction timing module of FIG. 2 selecting a single trigger and gap pair in accordance with the present disclosure.

FIG. 3 shows the interaction timing module 214 of FIG. 2 selecting a single event trigger (or trigger) and gap pair from one or more groups of event triggers, gaps, and/or event trigger and gap pairs, which may be stored in memory. The interaction timing module 214 may include a trigger type selection module 300, a gap type selection module 302 and a criterion selection module 304. The trigger type selection module 300 selects an event trigger 305 based on an interactive goal 306, which may be provided by the data gathering and interactive goal module 208. The event trigger selection may be based on locations of the host vehicle and a proposed destination (e.g., location of a fuel station or a charging station), engine temperature being greater than a first threshold, oil pressure of engine being below a second threshold, and/or based on another event trigger.

The gap type selection module 302 selects a gap 307 based on the interactive goal. The gap type may be measured in distance (e.g., miles or kilometers), time (e.g., seconds), fuel status (e.g., liters or gallons), battery or battery pack status (e.g., kWh), and/or via other measurement parameters.

The criterion selection module 304 evaluates event trigger and gap pairs and determines a criterion that provides an event trigger and gap pair with a high percentage of interaction dialog completion. An optimality criterion is selected and used to control the selection of the event trigger and gap pair selected by the modules 300 and 302.

Figure 4:
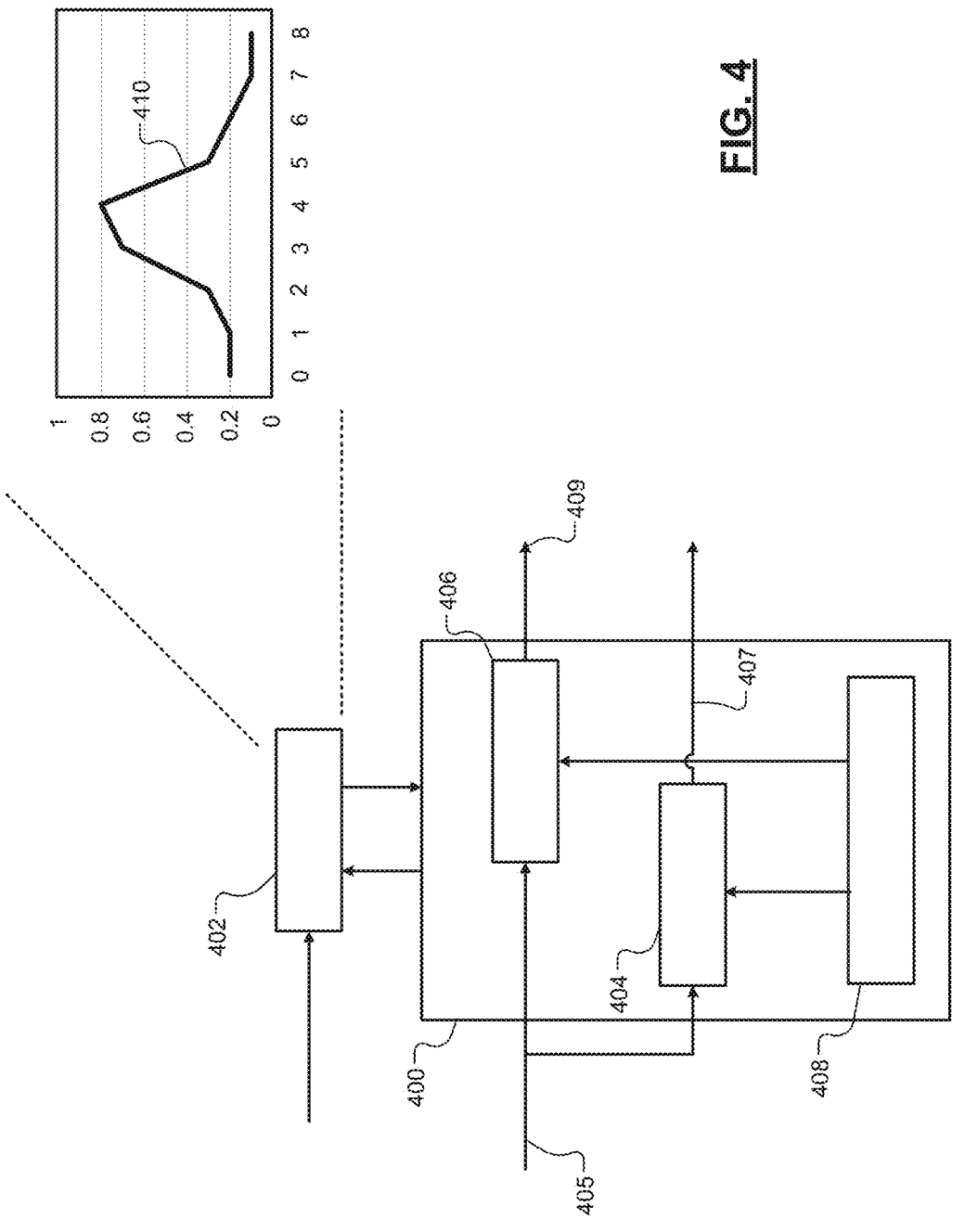
FIG. 4 is a functional block diagram of another example interaction timing module and a histogram module for selection of a single trigger and gap pair in accordance with the present disclosure.

FIG. 4 shows an interaction timing module 400, which may replace the interaction timing module 214 of FIG. 2, and a histogram module 402 for a single trigger and gap pair. The interaction timing module 400 may include a trigger type selection module 404, a gap type selection module 406, and a criterion selection module 408, which may operate similarly as the modules 300, 302, 304 of FIG. 3 and may be in communication with the histogram module 402. The modules 404, 406 operate based on an interactive goal 405 and select an even trigger 407 and a gap 409. The histogram module 402 may generate a histogram based on historic data such as percentage completion of interaction dialogs versus gap. The histogram includes percentages of completion for different gaps. A gap value where the percentage completion is highest may be selected by the gap type selection module 406. Thus, the gap is selected from a group of gaps, which may be associated with one or more event triggers. In an embodiment, the histogram is generated based on historic data of event triggers, gaps, and the optimality criterion. The histogram module 402 or other module may periodically perform exploration to verify that the histogram has not changed. FIG. 4 shows an example histogram curve 410, where a maximum percentage completion of interaction is at 4, which may be in seconds.

Figure 5:
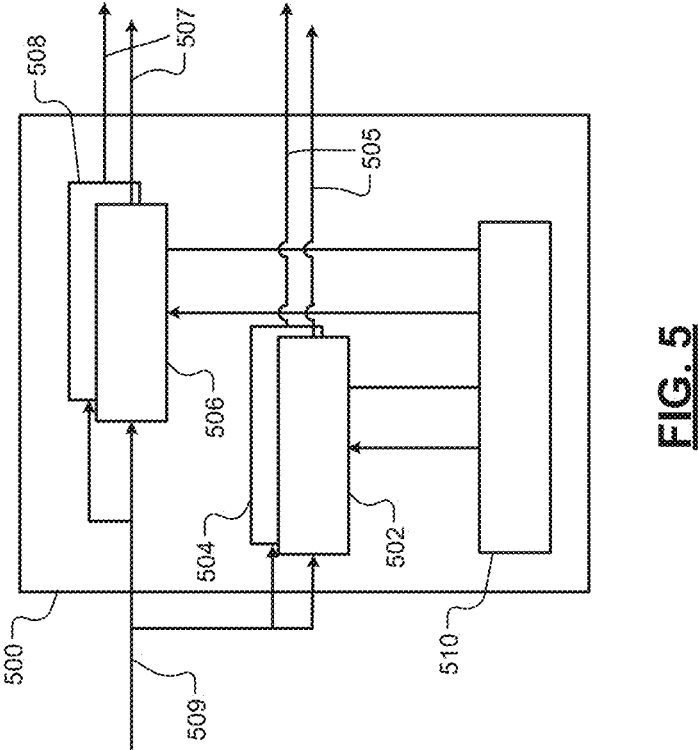
FIG. 5 is a functional block diagram of another example interaction timing module selecting multiple trigger and gap pairs in accordance with the present disclosure.

FIG. 5 shows another example of another interaction timing module 500, which may be used instead of the interaction timing module 214 of FIG. 2, and is configured to select multiple trigger and gap pairs. The interaction timing module 500 may include multiple trigger type selection modules 502, 504, multiple gap type selection modules 506, 508, and a criterion selection module 510. The modules 502, 504, 506, 508, 510 may operate similarly as the modules 300, 302, 304 of FIG. 3. The trigger type selection modules 502, 504 select event triggers 505 and the gap type selection modules 506, 508 select gaps 507 based on a same interactive goal 509. Each of the event triggers 505 is associated with a respective one of the selected gaps 507. The multiple selected event triggers and gap pairs may be combined and used when determining whether to initiate an interactive dialog and when determining timing of the interactive dialog. The criterion selection module 510 may review historical data to determine the event trigger and event pair combinations with the highest associated percentages of acceptance and completion.

Figure 6:
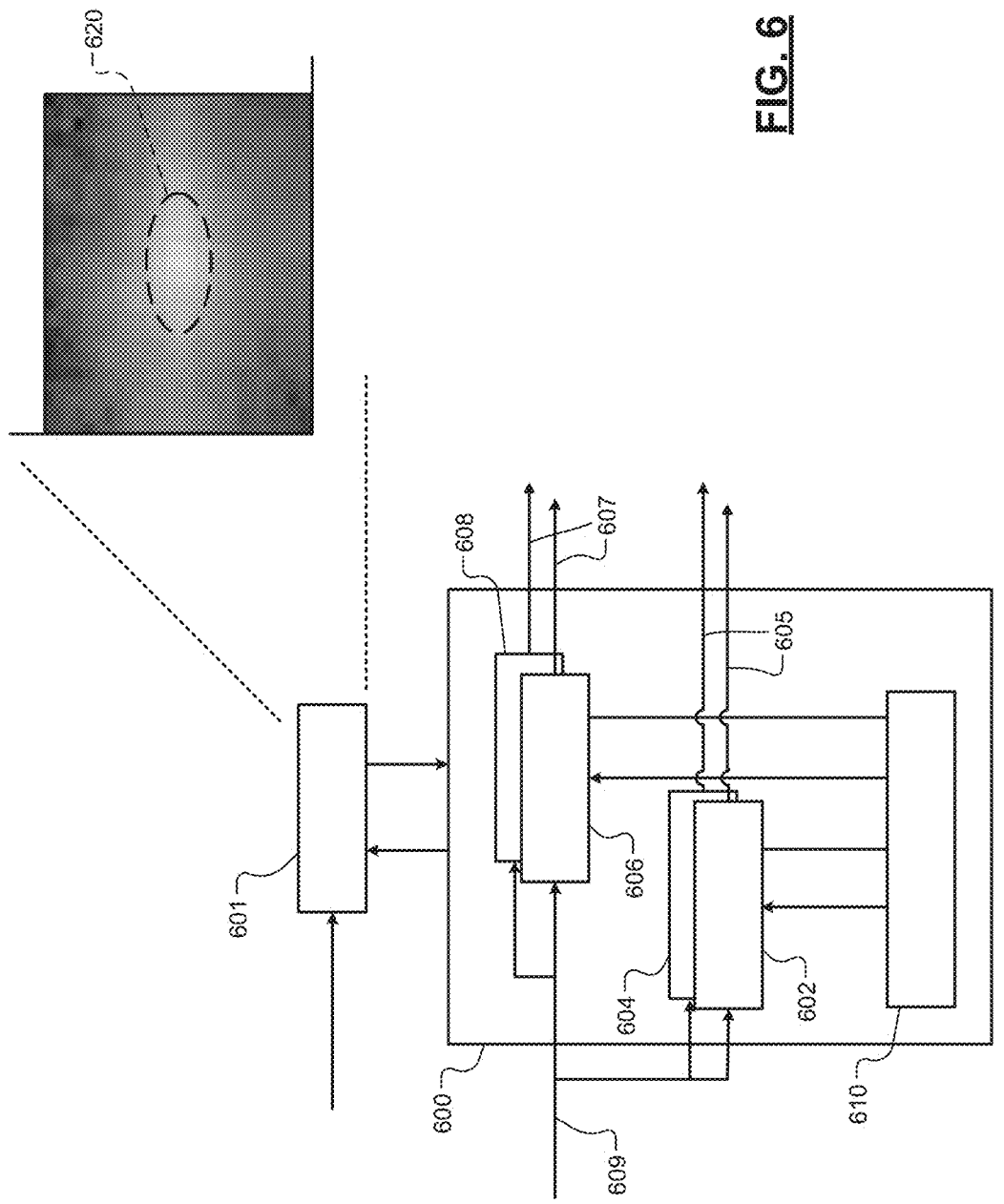
FIG. 6 is a functional block diagram of another example interaction timing module and a histogram module for selection of multiple trigger and gap pairs in accordance with the present disclosure.

FIG. 6 shows an interaction timing module 600, which may replace the interaction timing module 214 of FIG. 2, and a histogram module 601 for multiple trigger and gap pairs. The interaction timing module 600 may include multiple trigger type selection modules 602, 604, multiple gap type selection modules 606, 608, and a criterion selection module 610. The modules 602, 604, 606, 608, 610 may operate similarly as the modules 300, 302, 304 of FIG. 3 and the modules 502, 504, 506, 508, 510 of FIG. 5. The trigger type selection modules 602, 604 select event triggers 605 and the gap type selection modules 606, 608 select gaps 607 based on a same interactive goal 609. Each of the event triggers 605 is associated with a respective one of the selected gaps 607.

The histogram module 601 generates a histogram for different gap sets A and B. The histogram is a two-dimension feature space with a combination of gaps and their associated event triggers. Each of the gap sets A and B are associated with a respective one of the event triggers 605. In the example shown, a histogram is shown and a threshold ring 620. In an embodiment, two gaps within the threshold ring 620 are selected, one from the gap set A and another from the gap set B. In another embodiment, gaps at a center of the histogram and/or at the center of the threshold ring 620 are selected. The threshold ring 620 may be centered on the gaps that have the highest percentage of associated acceptance and completion. A threshold may be set and used in relationship with the optimality criterion, such that gap combinations having an associated percentage of acceptance and completion greater than the threshold are selected. If there are more than two gaps that have an associated percentage of acceptance and completion, then the two gaps having the highest associated percentage of acceptance and completion are selected.

Although FIGS. 5-6 are described with respect to two event trigger and gap pairs, more than two event trigger and gap pairs may be used. Other features can be combined using other relevant representations of the feature space. Optimal gaps may be predicted according to a criterion created using a logical operator or a machine learning algorithm.

Figure 7:
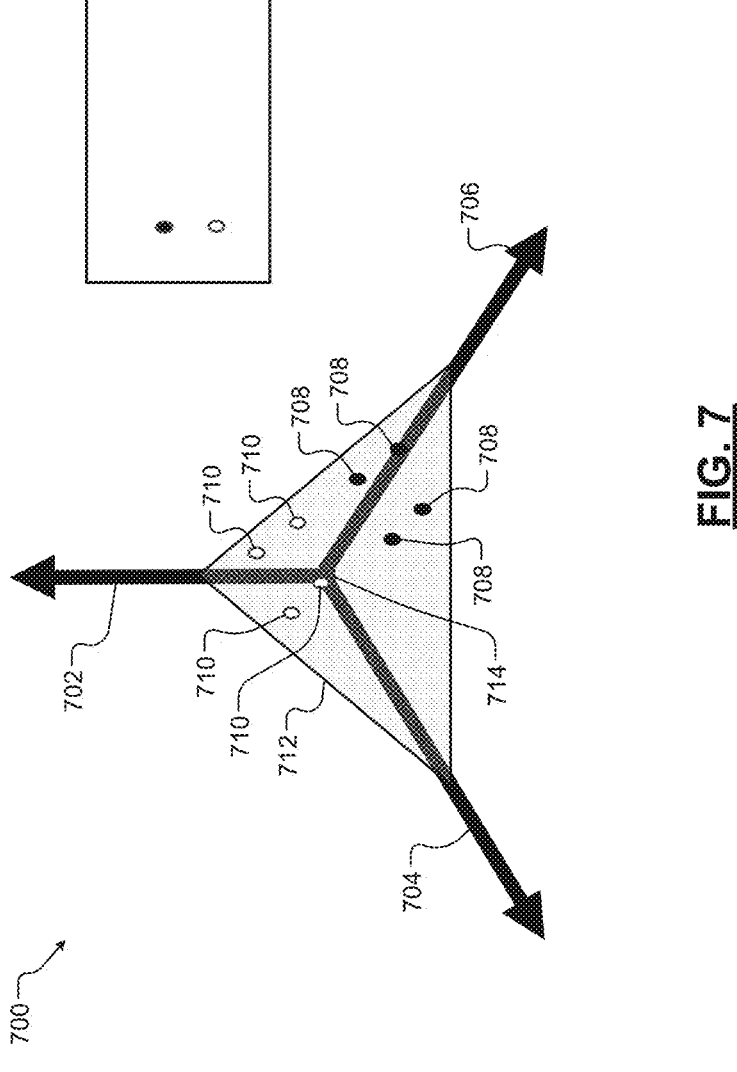
FIG. 7 is an example machine learning diagram associated with monitoring a gaze pattern of a vehicle occupant in accordance with the present disclosure.

FIG. 7 shows an example machine learning diagram 700 associated with monitoring a gaze pattern of a vehicle occupant. The machine learning diagram 700 and/or corresponding algorithm may be used by any of the interaction timing modules referred to herein. Machine learning occurs based on examples. Modeling locations in space in which interactions had correct timing and other locations in which interactions had incorrect timing is performed. In this space, models like k-means, probabilistic models, or deep learning are used to estimate the effectiveness of the timing of the interaction. The machine learning diagram 700 is a diagram relating i) a likelihood a driver is looking at the windshield (represented by arrow 702), ii) a likelihood a driver is looking at a center stack (represented by arrow 704), and iii) a likelihood a driver is looking at an instrument cluster (represented by arrow 706). Example points 708 for correct timing and example points 710 for incorrect timing are shown. The points 708 and 710 are within a triangle 712, which is located across an intersection point 714 of the arrows 702, 704, 706 and/or centered on the intersection point 714. Gaze patterns associated with points 708 may be used as event triggers.

When machine learning is used to determine the appropriate timing for initiating an interaction dialog, learning examples may be used to train the machine learning algorithm. This may include learning a driver's comfort acceleration ranges and jerk ranges. Acceleration being a derivative of (or change in) velocity and jerk being a derivative of (or change in) acceleration. Comfort ranges for the driver of longitudinal and lateral acceleration and longitudinal and lateral jerk may be learned. Rules for determining timing may be used based on these parameters and/or other parameters that define a typical pattern and/or characteristic of a driver.

Figure 8:
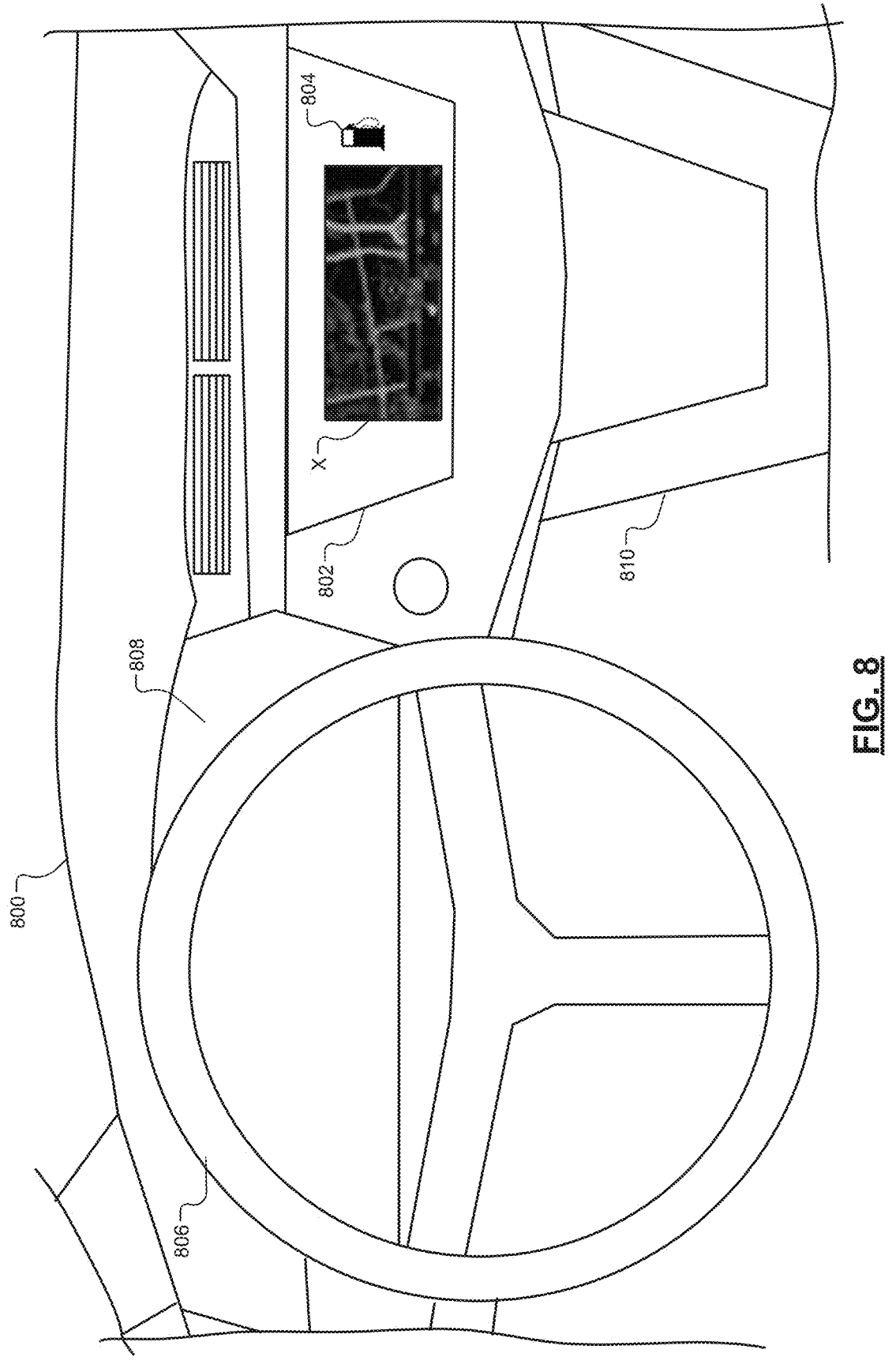
FIG. 8 is an example view of a dashboard of a vehicle including a display displaying an example interaction button to initiate a dialog in a low confidence situation in accordance with the present disclosure.

FIG. 8 shows a dashboard 800 of a vehicle including a display 802 displaying an example interaction button 804 to initiate an interaction dialog in a low confidence situation (lower confidence than for starting a speech interaction; however, high enough confidence to start a display interaction). The interaction button 804 is shown as an example for a refueling example. Other buttons and/or icons may be displayed for other situations. The interaction button 804 may be displayed when it is determined that there is a low confidence level that the user will accept and/or complete an interaction dialog associated with finding, locating, and driving to a gas station. In FIG. 8 a steering wheel 806, an instrument panel display 808, and a center console (or stack) 810 are shown. In situations when the perception module 206 of FIG. 2 has a low confidence of a driver's goal, the perception module 206 may initiate a dialog by displaying an icon, a button, and/or other item and/or modality. The driver can then touch the displayed item to respond and continue the dialog. The dialog module 216 may then continue with speech, text, and/or other interaction methods.

Figure 9:
FIG. 9 is a logic flow diagram illustrating a proactive interaction assistance method in accordance with the present disclosure.

FIG. 9 shows a logic flow diagram illustrating a proactive interaction assistance method. The method is primarily described with respect to the embodiment of FIG. 2 but is applicable to embodiments of FIGS. 1-8. The operations of this method may be iteratively performed.

At 900, information from navigation module 114 and sensor data from the sensors 150 are collected as described above. The following operations 902, 904, 906 may be performed concurrently (or in parallel).

At 902, the outward analysis module 200 detects traffic objects, and determines road information based on data received from the exterior sensors 152. At 904, the occupant module 202 tracks and monitors occupant behavior and receives occupant inputs, such as speech inputs, based on data received from the interior sensors 154. At 906, the vehicle status module 204 collects data from vehicle state (or status) sensors such as from the sensors 156.

At 908, the perception module 206 determines perception information for a potential interaction dialog with an occupant and optionally a situation category based on the information and data determined and collected during operations 900, 902, 904, and 906.

At 910, the data gathering and interaction goal module 208 collects perception data and relevant historical data and determines an interactive goal based thereon.

At 912, the perception data, the historical data, and the interactive goal may be received at the interaction style module 212, which may determine based thereon an interaction style.

At 914, an interaction timing module, such as any of the interaction timing modules referred to herein, receives the perception data, the historical data, and the interactive goal and determines based thereon interaction timing. The interaction timing may also be determined based on i) a situation category, ii) one or more event trigger and gap pairs, iii) rules, and/or iv) a machine learning algorithm. One or more trigger and gap pairs may be determined based on the perception data, the historical data, and the interactive goal as described above.

At 916, the timing interaction module may also determine whether timing is appropriate for an interaction dialog with the vehicle occupant.

At 918, the timing interaction module may determine that timing is inappropriate and refrain from interacting with the vehicle occupant.

At 920, the timing interaction module may determine that timing is appropriate and the dialog module 216 may initiate an interaction dialog with the vehicle occupant including providing a suggestion and/or an offer to the vehicle occupant. This may include performing a speech, text, and/or haptic based dialog and/or displaying an icon, button or other object for the vehicle occupant to select.

At 922, the dialog module 216 may determine whether the vehicle occupant has accepted the suggestion and/or offer. If yes, operation 924 may be performed, otherwise the method may end.

At 924, the dialog module 216 may perform assistance operations including optionally performing operations associated with a service, optionally performing navigation assistance, optionally performing autonomous driving assistance, and/or providing other assistance as described above. If navigation assistance is to be provided, the vehicle control module 103 may provide instructions to the driver to drive the host vehicle to a refueling station, a recharging station, and/or other selected destination. If autonomous driving assistance is to be provided, the vehicle control module 103 may control vehicle systems to drive the host vehicle to a refueling station, a recharging station, and/or other selected destination.

The examples set forth herein include a system for timing and style selection for proactive speech interaction. The system includes microphones and/or microphone arrays, inward looking cameras as part of a driver monitoring system (DMS), outward looking cameras, other external sensors, and a module for reading information from vehicle buses such as a CAN bus. A perception module is included for situation understanding purposes that combines collected information from input sources to create a coherent situation and context description. A dialog module selects the style, type and timing of an interaction dialog, initiates the interaction dialog at an appropriate time, and completes the interaction dialog.

The examples include adaptation and personalization. The examples close the loop and understanding whether a proactive dialog timing and style was successful. False alarms are minimized and/or prevented. A false alarm referring to a proactive dialog that was initiated at specific timing by the virtual assistance system and was cancelled by a vehicle occupant. This cancellation may be immediately after initiation or sometime thereafter. Misdetection is also minimized and/or prevented. Misdetection referring to an occupant-initiated dialog. The virtual assistant system did not predict that a dialog should have taken place at that time of the occupant-initiated dialog.

Adaptation and personalization are defined under a reinforcement learning (RL) framework. In such a case, success is defined based on whether a driver ignored an entire interaction, whether a driver executed the suggested action, whether the driver accepted the suggestion and/or offer, whether the driver completed an interaction dialog, etc. Such information may be agglomerated and be specific to a certain driver, to a certain driver performing a certain task, to a set of drivers (referred to as crowd sourcing), a set of drivers performing a certain task, etc. Different levels of agglomeration may be implemented. Rules may be generated for a specific driver or a set of drivers. The rules may be generated for a specific geographical location and/or generated for some other aspect. Event triggers and gap pairs may be selected based on the agglomeration used and/or the rules generated.

In an embodiment, operations described herein may be implemented such that a driver perceives maintenance of control of a host vehicle. Some drivers prefer to maintain control of a vehicle. Thus, the more operations a vehicle performs autonomously, the less in control of the vehicle a driver feels. Performing proactive operations can be perceived as taking over some control from a driver. Thus, proactive interruptions and proactive interaction dialogs may be limited. For example, the number of interaction dialogs per vehicle trip, per hour, per day, etc. may be limited to a predetermined number (e.g., 1-5). Thus, the examples herein address a gap between a proactive system that starts on its own and the concept of maintaining driver control of a host vehicle. To address the taking over control from a driver using a proactive system, a signal that speech interaction is about to start shortly may be generated and/or an override button, similar to the button 804 of FIG. 8, may be displayed on one of the displays referred to herein. The override button is located such that it can be easily touched by the driver to terminate the current interaction. In addition, the vehicle may be configured to request from the driver an amount of desired proactive speech interaction. For example, the virtual assistant system may ask the driver whether the driver prefers no proactive interaction, interaction not more than once a day, interaction X times a day or driving event, and/or whether the driver wants to participate in a beta evaluation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An assistance system comprising:
a perception module configured to collect sensor data including data tracking behavior of a vehicle occupant in a host vehicle, and to determine perception information describing a current situation warranting initiation of an interactive dialog with the vehicle occupant;
an interactive goal module configured to determine an interactive goal based on the determined perception information;
an interaction timing module configured to determine timing for initiating the interactive dialog based on the interactive goal including determining at least one event trigger and gap pair based on the interactive goal;
a dialog module configured to, based on the perception information, the timing, and the at least one event trigger and gap pair, initiate the interactive dialog to provide at least one of a suggestion and an offer to the vehicle occupant; and
a vehicle control module configured to control operation of at least one of a device and a system of the host vehicle in response to the vehicle occupant accepting the at least one of the suggestion and the offer.

2. The assistance system of claim 1, further comprising:
an outward analysis module configured to collect data from a plurality of exterior sensors;
an occupant module configured to collect data from a plurality of interior sensors; and
a vehicle status module configured to collect data from a plurality of vehicle status sensors,
wherein the perception module is configured to determine the perception information based on the data collected from the plurality of exterior sensors, the data collected from the plurality of interior sensors, and the data collected from the plurality of vehicle status sensors.

3. The assistance system of claim 1, wherein the perception module determines the perception information based on navigation information received from a navigation module.

4. The assistance system of claim 1, further comprising an interaction style module configured to select an interaction style from a group including speech, text, and haptic vibrations to communicate with the vehicle occupant during the interactive dialog,
wherein the dialog module is configured to, during the interactive dialog, communicate with the vehicle occupant using the interaction style.

5. The assistance system of claim 4, wherein the interaction style module is configured to select the interactive style based on historical data indicative of which interaction style is likely to be accepted by the vehicle occupant.

6. The assistance system of claim 1, wherein the interaction timing module is configured to determine a plurality of event trigger and gap pairs based on which to initiate the interactive dialog, the plurality of event trigger and gap pairs being determined based on the interactive goal.

7. The assistance system of claim 1, wherein:
the perception module is configured to determine a situation category and a corresponding confidence level; and
the interaction timing module is configured to determine the timing to initiate the interactive dialog based on the situation category and the confidence level.

8. The assistance system of claim 1, wherein:
the interaction timing module is configured to i) determine a selection criterion based on which to select at least one event trigger and gap pair, and ii) select the at least one event trigger and gap from a group of event trigger and gap pairs, wherein the selection criterion includes determining at least one of i) whether a percentage of at least one of acceptance and interactive dialog completion for the selected at least one event trigger and gap pair is greater than a threshold, and ii) whether the percentage of at least one of acceptance and interactive dialog completion for the selected at least one event trigger and gap pair is greater than a percentage of acceptance and interactive completion for other ones of the group of event trigger and gap pairs; and
at least one of the interaction timing module and the dialog module initiates the interactive dialog based on the selected at least one event trigger and gap pair.

9. The assistance system of claim 1, wherein:
the timing interaction module is configured to generate a histogram based on historical data including a plurality of gaps for at least one event trigger, and select at least one of the plurality of gaps based on the histogram; and
at least one of the interactive timing module and the dialog module initiates the interactive dialog based on the selected at least one of the plurality of gaps.

10. The assistance system of claim 1, wherein the perception module is configured to track gaze and head patterns of the vehicle occupant to determine the perception information based on the gaze and head patterns.

11. The assistance system of claim 10, wherein:
the perception module is configured to determine whether the gaze and head patterns are indicative of whether the vehicle occupant is looking for a refueling station or a recharging station; and
the interactive goal module is configured to generate the interactive goal to refuel the host vehicle or recharge a battery or a battery pack of the host vehicle.

12. The assistance system of claim 1, wherein the vehicle control module is configured to perform autonomous driving operations in response to the vehicle occupant accepting the at least one of the suggestion and the offer.

13. An assistance system comprising:

a perception module configured to collect sensor data including data tracking behavior of a vehicle occupant in a host vehicle, and to determine perception information describing a current situation warranting initiation of an interactive dialog with the vehicle occupant;

an interactive goal module configured to determine an interactive goal based on the determined perception information;

an interaction timing module configured to determine timing for initiating the interactive dialog based on the interactive goal;

a dialog module configured to, based on the perception information and the timing, initiate the interactive dialog to provide at least one of a suggestion and an offer to the vehicle occupant; and a vehicle control module configured to control operation of at least one of a device and a system of the host vehicle in response to the vehicle occupant accepting the at least one of the suggestion and the offer, wherein the vehicle control module is configured to activate at least one of a defogging system and an air recirculation feature of a heating, ventilation, and air-conditioning system in response to the vehicle occupant accepting the at least one of the suggestion and the offer.

14. An assistance method comprising:

collecting sensor data including data tracking behavior of a vehicle occupant in a host vehicle;

determining perception information describing a current situation warranting initiation of an interactive dialog with the vehicle occupant;

determining an interactive goal based on the determined perception information;

determining timing for initiating the interactive dialog based on the interactive goal;

generating a histogram based on historical data including a plurality of gaps for at least one event trigger;

selecting at least one of the plurality of gaps based on the histogram;

based on the perception information, the timing, and the selected at least one of the plurality of gaps, initiating the interactive dialog to provide at least one of a suggestion and an offer to the vehicle occupant; and controlling operation of at least one of a device and a system of the host vehicle in response to the vehicle occupant accepting the at least one of the suggestion and the offer.

15. The assistance method of claim 14, further comprising:

collecting navigation information;

collecting data from a plurality of exterior sensors;

collect data from a plurality of interior sensors;

collecting data from a plurality of vehicle status sensors; and determining the perception information based on the navigation information, the data collected from the plurality of exterior sensors, the data collected from the plurality of interior sensors, and the data collected from the plurality of vehicle status sensors.

16. The assistance method of claim 14, further comprising:

selecting an interaction style from a group including speech, text, and haptic vibrations to communicate with the vehicle occupant during the interactive dialog, and based on historical data indicative of which interaction style is likely to be accepted by the vehicle occupant; and during the interactive dialog, communicating with the vehicle occupant using the selected interaction style.

17. The assistance method of claim 14, further comprising determining at least one event trigger and gap pair based on which to initiate the interactive dialog, the at least one event trigger and gap pair being determined based on the interactive goal.

18. The assistance method of claim 14, further comprising:

determining a situation category and a corresponding confidence level; and determining the timing to initiate the interactive dialog based on the situation category and the confidence level.

* * * * *